(12) United States Patent
Eskicioglu

(10) Patent No.: US 7,224,806 B2
(45) Date of Patent: May 29, 2007

(54) THRESHOLD CRYPTOGRAPHY SCHEME FOR CONDITIONAL ACCESS SYSTEMS

(75) Inventor: Ahmet Eskicioglu, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 262 days.

(21) Appl. No.: 09/961,835

(22) Filed: Sep. 24, 2001

(65) Prior Publication Data

US 2002/0108040 A1 Aug. 8, 2002

Related U.S. Application Data

(63) Continuation-in-part of application No. 09/581,064, filed on Nov. 13, 2000.

(60) Provisional application No. 60/253,781, filed on Nov. 29, 2000.

(51) Int. Cl.
*H04L 9/00* (2006.01)

(52) U.S. Cl. .................. 380/286; 713/181; 713/180

(58) Field of Classification Search ............. 380/286, 380/46, 47; 713/166, 180, 181
See application file for complete search history.

(56) References Cited

U.S. PATENT DOCUMENTS

| 4,797,672 A * | 1/1989 | Kousa ................. 340/5.26 |
|---|---|---|
| 5,675,649 A | 10/1997 | Brennan et al. .......... 380/21 |
| 5,724,425 A | 3/1998 | Chang et al. ............ 380/25 |
| 5,764,767 A | 6/1998 | Beimel et al. ........... 380/21 |
| 5,825,880 A | 10/1998 | Sudia et al. ............ 380/21 |
| 5,901,229 A | 5/1999 | Fujisaki et al. ......... 380/3 |
| 5,937,066 A | 8/1999 | Gennaro et al. ......... 380/21 |
| 5,978,475 A | 11/1999 | Schneier et al. ........ 380/4 |
| 5,991,414 A | 11/1999 | Garay et al. ........... 380/25 |
| 6,088,454 A | 7/2000 | Nagashima et al. ...... 380/49 |
| 6,182,214 B1 | 1/2001 | Hardjono ............... 713/163 |
| 6,192,472 B1 | 2/2001 | Garay et al. ........... 713/165 |
| 6,209,091 B1 | 3/2001 | Sudia et al. ........... 713/175 |
| 6,490,680 B1 * | 12/2002 | Scheidt et al. ......... 713/166 |

FOREIGN PATENT DOCUMENTS

WO    WO 00 49756 A    9/2000

OTHER PUBLICATIONS

Shamir, How to Share a Secret, ACM, vol. 22, pp. 612-613.*

(Continued)

*Primary Examiner*—Gilberto Barron
*Assistant Examiner*—Paula Klimach
(74) *Attorney, Agent, or Firm*—Joseph J. Laks; Robert D. Shedd; Paul P. Kiel

(57) ABSTRACT

A method and apparatus for managing access to a signal representative of an event of a service provider, including receiving said signal in a smart card, said signal being scrambled using a scrambling key, receiving, in said smart card, data representative of a first share; constructing said scrambling key using said first share and at least one additional share, said additional share being stored in said smart card; and descrambling said signal using said constructed scrambling key to provide a descrambled signal, wherein the step of constructing said scrambling key comprises calculating the Y-intercept of the line formed on said Euclidean plane by said first, and said at least one additional share.

19 Claims, 6 Drawing Sheets

OTHER PUBLICATIONS

Simmons, J.D.: "Prepositioned Shared Secret and/or Shared Control Schemes", Eurocrypt '89 Proceedings, Springer-Verlag, 'Online! 1990, p. 437-467, XP002201103.

Menzeles, Oorschot: "Handbook of Applied Cryptography" 1997, CRC Press LLC, USA XP002201106, p. 364, p. 524-527.

Blundo, Cresti, De Santis, Vaccaro: "Fully Dynamic Secret Sharing Schemes" Dipartamento di Informatica ed Applicazioni, 'Online! 1994, p. 110-125, XP002201105, Universita di Salerno, Abstract, Chapter 1 and 6.

\* cited by examiner

THRESHOLD CRYPTOGRAPHY SCHEME FOR CONDITIONAL ACCESS SYSTEMS

This application claims the benefit of U.S. provisional application Ser. No. 60/253,781 filed Nov. 29, 2000, and is a Continuation-in-Part of co-pending U.S. application Ser. No. 09/581,064 filed Nov. 13, 2000, which are hereby incorporated herein by reference.

FIELD OF THE INVENTION

This invention concerns a system for providing conditional access (i.e., managing access) to a received scrambled audio/visual (A/V) signal from a variety of sources, such as broadcast television networks, cable television networks, digital satellite systems, and internet service providers. Utilizing the concept of secret sharing, the system does not require the full descrambling keys to be sent to the receiving device under encryption. The keys are recovered using at least one share received from the service provider and at least two shares stored in the device.

BACKGROUND OF THE INVENTION

Today, a user may receive services from a variety of service providers, such as broadcast television networks, cable television networks, digital satellite systems, and internet service providers. Most television receivers are capable of receiving unscrambled information or programs directly from broadcast and cable networks. Cable networks providing scrambled programs usually require a separate stand alone set-top box to descramble the program. Similarly, digital satellite systems usually provide scrambled programs that also require the use of a separate set-top box. These set-top boxes may utilize a removable smart card which contain the keys necessary for recovering the descrambling keys. Protection of these important keys is paramount to prevent unauthorized copying of the programs.

Conditional access systems allow access to services (e.g., television, internet, etc.) based on payment and/or other requirements, such as authorization, FIG. 7 shows a conventional conditional access system architecture. The information or content (e.g., television program, movie, etc.) and the entitlement messages are protected (e.g., encrypted) before they are delivered to the subscriber. Presently, there are two (2) types of entitlement messages associated with each program or service. Entitlement control messages (ECMs) carry descrambling keys (sometimes referred to as 'control words') and a brief description of the program (e.g., program number, date, time, cost, etc.). Entitlement management messages (EMMs) specify the service-related authorization levels (e.g., indicating the type or service, the duration of the service, etc.). The EMMs can be distributed on the same channel as the service, or may be sent on a separate channel, such as a telephone line. The ECMs are typically multiplexed and sent with the associated program.

FIG. 8 shows a conventional transmitter side architecture for a conditional access system, such as the one shown in FIG. 7. As will be understood, streams of audio, video and data from the service are multiplexed before they are scrambled, modulated and sent to the receiver (i.e., subscriber).

FIG. 9 shows a conventional receiver side architecture for a conditional access system, such as the one shown in FIG. 7. As will be understood, the received bit stream is demodulated, decrypted and decompressed before separate audio, video and data streams are sent to the display device (e.g., television screen).

Encryption-based technologies are widely used for protecting distributed content. If the subscriber is authorized to watch a particular protected program, the program is descrambled and sent to a display (e.g., television screen) for viewing. In most conditional access systems, the subscriber will have a digital device (e.g., set-top box, digital television, digital videocassette recorder) which includes a smart card for descrambling the program based on the EMMs and ECMs.

Programs are typically scrambled using symmetric ciphers such as the Data Encryption Standard (DES). For security reasons, the scrambling key (and hence the ECM) is changed frequently, the period of change being on the order of a few seconds. Although the conditional access provider often privately defines the protection of the ECMs, public key cryptography is a viable tool for transporting keys from the service provider to the subscribers. The descrambling keys are encrypted with a public key on the transmitter side, and recovered by the corresponding private key (stored in the smart card of the receiver) on the receiver side.

However, public key cryptography has significant drawbacks. For example, public key schemes are significantly slower than symmetric key schemes, and often have longer keys (i.e., keys with more alpha-numeric characters). Additionally, computationally demanding algorithms (such as RSA described above) are required in order to recover the key.

Separating the security functionality from the navigational functionality (i.e., channel surfing) in these digital devices is important. Separation allows device manufacturers to produce devices which operate independently of the specific conditional access systems. This is important for two reasons:

(1) Until recently set-top boxes were not readily available at retail stores; they were manufactured for cable companies who delivered them directly to the subscriber. Major consumer electronics manufacturers and electronics retailers have objected to this practice as monopolistic.

(2) From a security standpoint, if the keys are discovered ('hacked'), the conditional access provider needs only to replace the smart card in the affected devices (e.g., set-top boxes), and not reconfigure the entire system.

Thus, there is presently a need for a scheme for protecting information which utilizes a concept other than public key cryptography, such as threshold cryptography.

SUMMARY OF THE INVENTION

The present invention defines a method and apparatus for managing access to a signal, representative of an event of a service provider, utilizing a smart card. That is, this method comprises receiving in a smart card a signal that is scrambled using a symmetric scrambling key, receiving data representative of a first share, constructing the scrambling key using the first share and at least two additional shares that are stored in the smart card and descrambling the signal using the constructed scrambling key to provide a descrambled signal.

In accordance with a first exemplary embodiment of the present invention, first, second and third shares are used. The first, second and third shares are points on a Euclidean plane and the step of constructing the scrambling key comprises calculating the Y-intercept of the parabolic curve formed on the Euclidean plane by the first, second and third shares.

In accordance with a third exemplary embodiment of the present invention, first, second, third and fourth shares are used. The first, second, third and fourth shares are points on a Euclidean plane and the step of constructing the scrambling key comprises calculating the Y-intercept of the curve formed on the Euclidean plane by the first, second, third and fourth shares. In general, any number of shares may be used, depending upon the level of security required.

BRIEF DESCRIPTION OF THE DRAWINGS

FIG. 3b is a graphical representation of an allocation of a unique and non-overlapping range for each service provider in accordance with FIG. 3a.

DETAILED DESCRIPTION

In a conditional access (CA) system, signals are usually scrambled using symmetric ciphers such as the Data Encryption Standard (DES). For security reasons, the scrambling key is changed frequently, the period of change being in the order of a few seconds. The protection of the descrambling keys (sent with the signals) is often provided by public-key cryptography, which as discussed above requires relatively significant computational power and memory. This invention resides, in part, in recognition of the described problem, and, in part, in providing a solution to the problem.

A signal (e.g., an event or program) as described herein comprises information such as (1) audio/visual data (for example, a movie, weekly "television" show or a documentary); (2) textual data (for example, an electronic magazine, paper, or weather news); (3) computer software; (4) binary data (for example, images); (5) HTML data (for example, web pages); or any other information for which access control may be involved. The service providers include any provider broadcasting events, for example, traditional broadcast television networks, cable networks, digital satellite networks, providers of electronic list of events, such as electronic program guide providers, and in certain cases internet service providers.

The present invention provides a method and apparatus for securely transporting the descrambling keys. The present invention has particular use in a conditional access system, in which programs or services may be obtained from one of a plurality of sources. The method when implemented within a device, such as a digital television, digital video cassette recorder or set-top box, provides convenient management of the descrambling keys because only a portion of the data necessary for key construction is stored therein. For simplicity, the below description of the invention will be directed towards an implementation using a digital television and a smart card.

Figure 1:
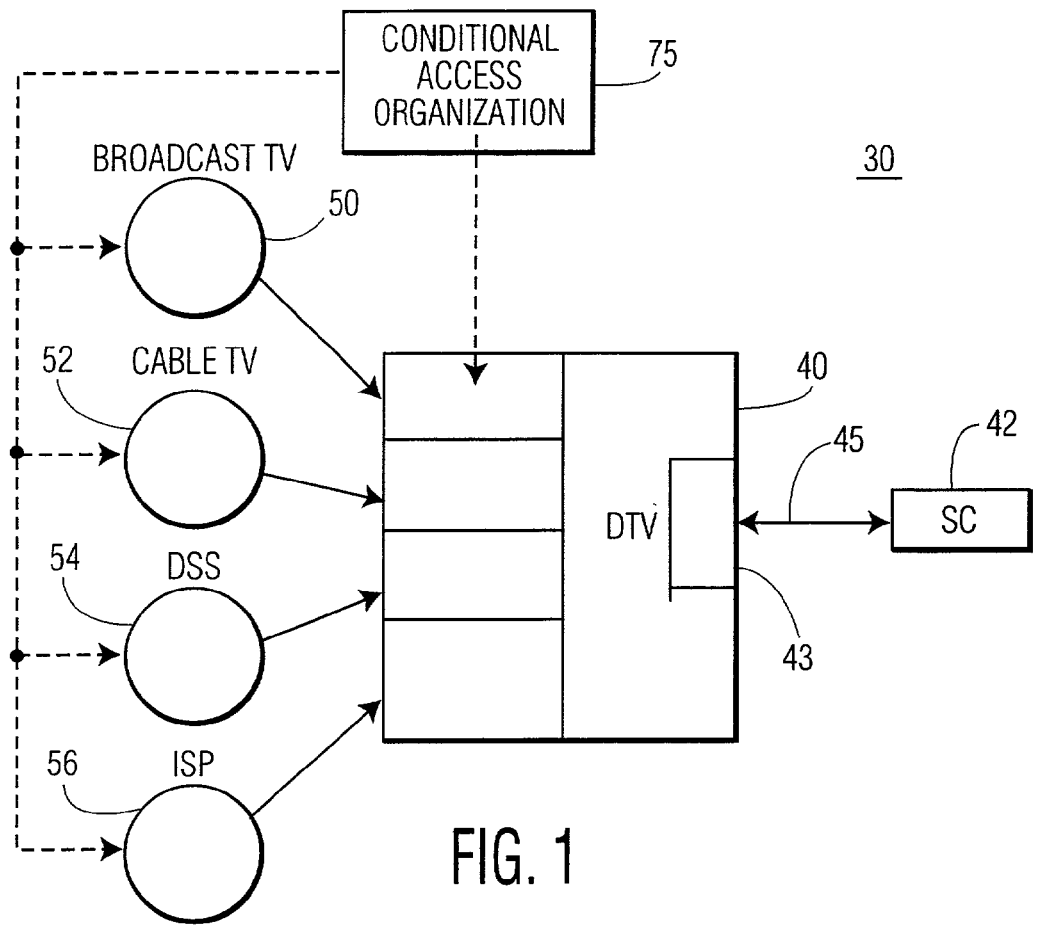
FIG. 1 is a block diagram illustrating one architecture for interfacing a common set-top box to a variety of service providers.

In FIG. 1, system 30 depicts the general architecture for managing access to a digital television (DTV) 40. Smart Card (SC) 42 is inserted into, or coupled to, a smart card reader 43 of DTV 40; an internal bus 45 interconnects DTV 40 and SC 42 thereby permitting the transfer of data therebetween. Such smart cards include ISO 7816 cards having a card body with a plurality of terminal pins arranged on a surface in compliance with National Renewable Security Standard (NRSS) Part A or PCMCIA cards complying with NRSS Part B.

DTV 40 has the ability to receive services from a plurality of service providers (SPs), such as a broadcast television SP 50, a cable television SP 52, a satellite system SP 54, and an internet SP 56. Conditional Access Organization (CA) 75 is not directly connected to either the service providers or DTV 40 but deals with key management and issues public and private key pairs which may be used, if necessary, as explained below.

The present invention employs the concept of secret sharing which eliminates the requirement for using public key cryptography (or any other cipher system) to ensure secure transmission of the audio/visual (A/V) stream from a service provider (e.g., SP 50–56) to the smart card (e.g., SC 42) of the subscriber.

The present invention employs an application of a secret sharing scheme, originally developed by Adi Shamir, known as a 'threshold scheme' or 'threshold cryptography' (See, A. Shamir, "How to share a secret," Communications of the ACM, Vol. 22, No. 11, pp. 612–613, November 1979). An (t,n) threshold scheme, such as the one proposed by Shamir, involves breaking a secret into n pieces (which may be called 'shares' or 'shadows') in such a way that at least t (<=n) of the pieces are required to reconstruct the secret. A perfect threshold scheme is a threshold scheme in which knowledge of (t−1) or fewer pieces ('shares' or 'shadows') provides no information about the secret.

For example, with a (3,4) threshold scheme, the secret is divided into four shares but only three of the shares are required to reconstruct the secret. Two of the shares, however, cannot reconstruct the secret. In Shamir's (t,n) threshold scheme, choosing a higher value for t, and storing (t−1) secrets in the smart card would increase the system's resistance to ciphertext only attacks, but would lead to more computations for polynomial construction.

Such a threshold scheme reduces the computational requirements for the smart card in symmetric key recovery. For each new key, only a simple operation is performed (i.e., the value of the polynomial at x=0 is computed), as compared to RSA decryption which involves modular exponentiation. Additionally, security is perfect (i.e., given knowledge of $(x_1, y_1)$, all values of the secret remain equally probable).

The present invention utilizes the principles of Shamir's secret sharing to conceal the identity of a key for descrambling a scrambled signal in a conditional access system. In particular, the present inventor proposes a scheme where the scrambling key comprises the Y-intercept of a specific line or curve formed by two or more points in a Euclidean plane.

In the simplest embodiment of this scheme, the receiver (e.g., smart card) is manufactured with a share or shares already stored therein (this is often referred to as a 'prepositioned' shared secret scheme, as discussed below). This stored share is used to compute the key to scramble a signal at a transmitter. When the scrambled signal is transmitted, an additional or 'activating' share is transmitted therewith. It will be noted that the 'activating' share does not need to be encrypted in this scheme, since knowledge of the activating share means nothing without the knowledge of the stored share. On receiving the 'activating' share, the receiver reconstructs the scrambled signal using a descrambling key which is computed by finding the Y-intercept of the line formed by the stored share and the 'activating' share. Each time a new key is required, a new 'activating' share may be selected at the transmitter, thereby changing the Y-intercept of the line formed by the stored share and the 'activating' share. In this way, an infinite number of scrambling keys may be defined and utilized without changing the smart card or the receiver hardware or software.

The key generation and distribution process may be automated by developing a program to perform the following steps:
(a) Choose a secret S; this will be a value along the Y-axis of a Euclidean plane
(b) Construct a first-degree polynomial f(x) that passes through the point (0, S) and another point $(x_0, y_0)$.
(c) Compute f(x) at $x_1$, where $x_1$ cannot equal $x_0$
(d) Distribute $(x_1, y_1)$ with the content protected with S Such a scheme as the one described above is often referred to as a 'prepositioned' shared secret scheme because a portion of the secret is 'prepositioned' at the receiver. In the above example, the 'prepositioned' share is the share which is stored at the receiver in the smart card. Such 'prepositioned' shared secret schemes have been discussed by others in the field of cryptology (See, G. J. Simmons, "How to (really) share a secret," Advances in Cryptology—CRYPTO '88 Proceedings, Springer-Verlag, pp. 390–448, 1990; G. J. Simmons, "Prepositioned shared secret and/or shared control schemes," Advances in Cryptology—EUROCRYPT '89 Proceedings, Springer-Verlag, pp. 436–467, 1990). By prepositioning a certain share or shares, the scrambling key can be changed relatively easily without changing any of the circuitry at the receiver; only the 'activating' share need to be changed.

It will be noted that the above algorithm outlines a prepositioned secret sharing scheme which utilizes a secret S with only 2 shares (i.e., 2 points of a line on a Euclidean plane). Of course, other more complex secrets S can be developed which have many more shares (points). The important aspect of a prepositioned secret sharing scheme is that some of the shares are 'prepositioned' at the receiver.

The present invention involves storing at least one of the shares of a secret at a specific location (e.g., in a smart card memory). The stored share is then used in conjunction with an 'activating' share to construct the secret. In a (4, 4) scheme, for example, preferably three (3) of the four (4) shares are stored at the specific location (e.g., smart card). Then, the last share (also referred to herein as the 'activating' share) is transmitted to the location to obtain the secret. It is important to note that with the present invention, the secret is not the shares themselves, but the Y-intercept of the line or curve (for higher order polynomials) formed by the shares when expressed as points on a Euclidean plane.

Figure 2:
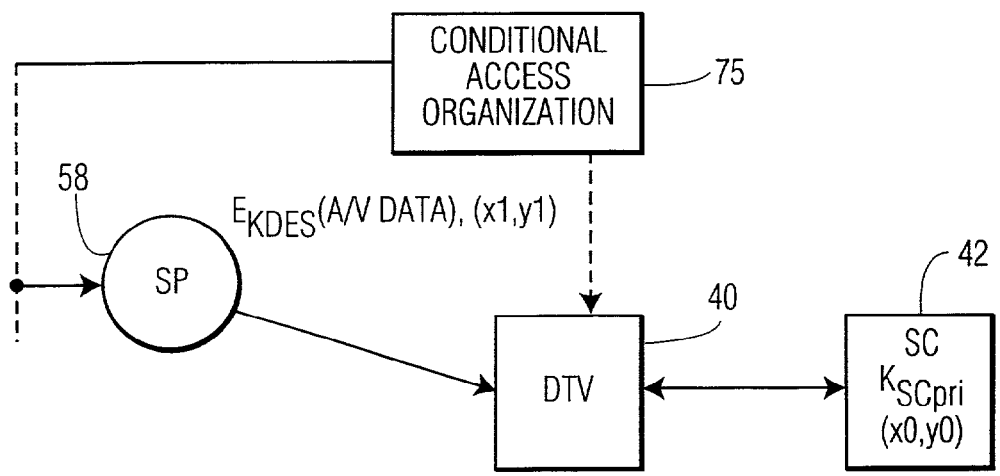
FIG. 2 is a block diagram a system for managing access to a device in accordance with the invention.

FIGS. 2 and 3 together, demonstrate a first exemplary embodiment of the present invention. In the first exemplary embodiment, a secret with two shares is used. As noted above, each share is defined by a point on a Euclidean plane. Particularly, stored in SC 42 is a first share (or data point). The first share may be thought of as a single point on a Euclidean plane (i.e., in the form of $(x_0, y_0)$). Service provider 58 transmits a signal (or event or program) that may be scrambled by a symmetric key, for example a Data Encryption Standard (DES) key. In addition to the scrambled signal, service provider 58 transmits a second (or 'activating') share. Similarly, the second share may be a second single point from the same Euclidean plane (i.e., in the form of $(x_1, y_1)$).

The scrambled A/V signal and the second ('activating') share are received by DTV 40 and are sent to SC 42 for processing. SC 42 receives the second ('activating') share and utilizes both the stored first share and the received second share to reconstruct (or recover) the symmetric key. SC 42 then uses the reconstructed symmetric key to descramble the received scrambled A/V signal and generate a descrambled A/V signal. This descrambled A/V signal is provided to DTV 40 for display.

Recovery of the symmetric key is achieved by constructing a polynomial utilizing the first and the second shares; the y-intercept of the constructed polynomial being the symmetric key. For example, given $(x_0, y_0)$ and $(x_1, y_1)$, the symmetric key is constructed by computing the value of S in the given finite field, where:

$$S=f(0)=y_0-((y_1-y_0)/(x_1-x_0))*(x_0)$$

Figure 3A:
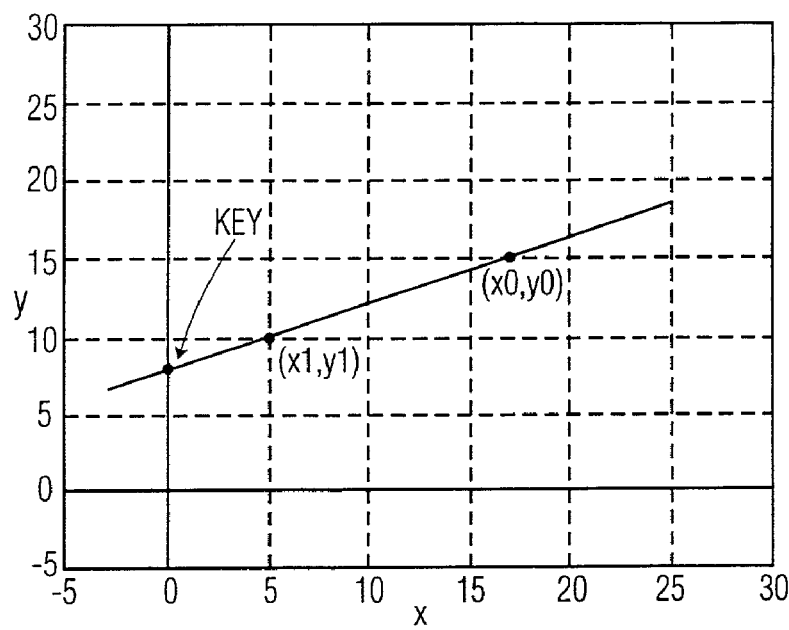
FIG. 3a is a graphical representation of the determination of the scrambling key in accordance with a first exemplary embodiment of the present invention.
Figure 3B:
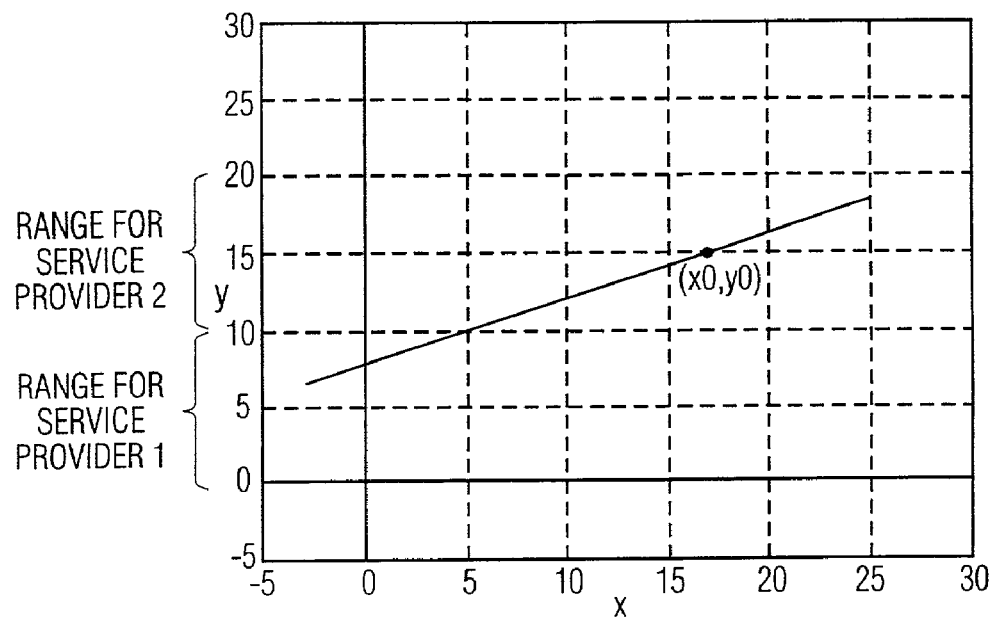

FIG. 3a illustrates a graphical representation of the first exemplary embodiment of the present invention showing exemplary shares $(x_0, y_0)$ and $(x_1, y_1)$, and a line formed thereby which crosses the Y-axis at a specific point (which is the key). For demonstrative purposes the plot in FIG. 3a is obtained using real numbers, and not modular arithmetic.

Such an approach as the one described above with reference to the first exemplary embodiment permits more than one service provider to share the stored second share $(x_0, y_0)$ (i.e., 'activating' share). Each service provider would then be free to choose its own first share (i.e., $(x_1, y_1)$). The probability of constructing polynomials with identical y-intercepts (i.e., identical symmetric keys) is low. However, the range of possible second shares could be allocated such that each service provider has a unique and non-overlapping range (see FIG. 3b). Further, it is within the scope of the present invention that each service provider could choose its own first share which could be encrypted using the public key of the smart card before downloading. The share would be recovered by the smart card using its private key $K_{scpi}$. Additionally, as explained below, scrambling portions of the event with different keys and transmitting different second shares may increase the robustness of the defined system.

To consider an example in accordance with the first exemplary embodiment of the present invention, assume points $(x_0, y_0)=(17,15)$ and $(x_1, y_1)=(5,10)$ and p=23. The first-degree polynomial:

$$f(x)=a_1x+a_0 \text{ (mod 23)}$$

passing through $(x_0, y_0)$ and $(x_1, y_1)$ can be constructed by solving:

$$a_1(17)+a_0=15 \text{ (mod 23) and}$$

$$a_1(5)+a_0=10 \text{ (mod 23)}$$

The solution $(a_1, a_0)=(10, 6)$ gives the polynomial:

$$f(x)=10x+6 \pmod{23}$$

The value of the secret S can be discovered by computing f(0):

$$S=f(0)=6 \pmod{23}$$

Thus, according to the above example the value of the secret, and thus the scrambling key, would be 6 (mod 23). Of course the value of this secret will change with each different value of $(x_1, y_1)$.

Figure 4:
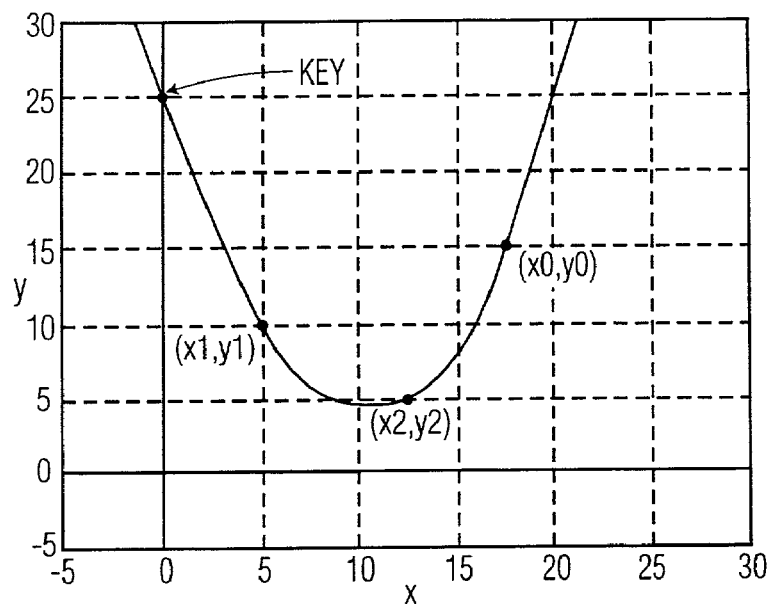
FIG. 4 is a graphical representation of the determination of the scrambling key in accordance with a second exemplary embodiment of the present invention.

FIG. 4 illustrates a key recovery scheme according to a second exemplary embodiment of the present invention that utilizes three shares for (as opposed to the two shares of the first exemplary embodiment). In the second exemplary embodiment, recovery of the symmetric key is achieved by constructing a second-degree polynomial (i.e., parabolic curve) utilizing first, second and third shares (e.g., $(x_0,y_0)$, $(x_1,y_1)$, $(x_2,y_2)$); the y-intercept of the constructed second-degree polynomial being the symmetric key.

To consider an example in accordance with the second exemplary embodiment of the present invention, assume points $(x_0, y_0)=(17, 15)$, $(x_1, y_1)=(5, 10)$, and $(x_2, y_2)=(12, 6)$, and p=23. The second-degree polynomial:

$$f(x)=a_2x^2+a_1x+a_0 \pmod{23}$$

passing through $(x_0, y_0)$, $(x_1, y_1)$ and $(x_2, y_2)$ can be constructed by solving:

$$a_2*(17^2)+a_1*(17)+a_0=15 \pmod{23}$$

$$a_2*(12^2)+a_1*(12)+a_0=6 \pmod{23} \text{ and}$$

$$a_2*(5^2)+a_1*(5)+a_0=10 \pmod{23}$$

The solution $(a_2, a_1, a_0)=(10, 20, 5)$ gives the polynomial:

$$f(x)=10x^2+20x+5 \pmod{23}$$

The value of the secret S can be discovered by computing f(0):

$$S=f(0)=5 \pmod{23}$$

As shown in FIG. 4, the first, second and third shares may be expressed as points on a Euclidean plane. For demonstrative purposes the plot in FIG. 4 is obtained using real numbers, and not modular arithmetic.

Figure 5:
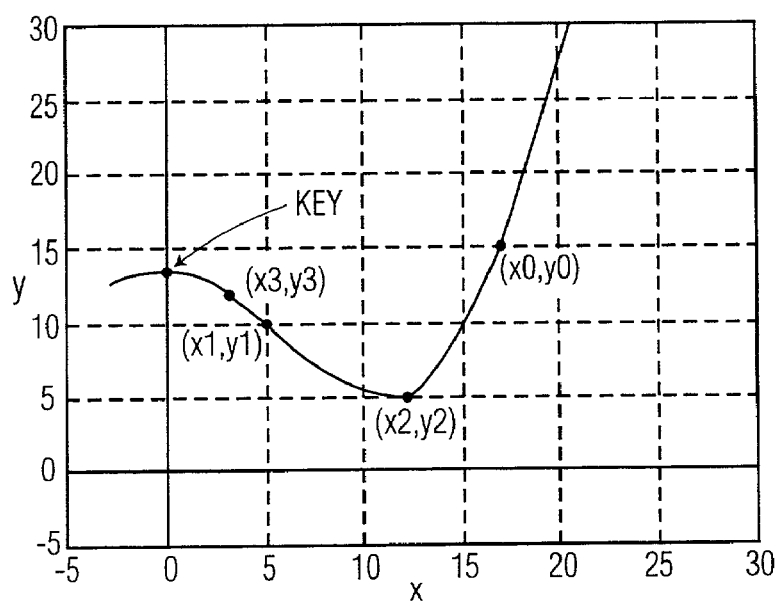
FIG. 5 is a graphical representation of the determination of the scrambling key in accordance with a third exemplary embodiment of the present invention.

FIG. 5 illustrates a key recovery scheme according to a third exemplary embodiment of the present invention that utilizes four shares. In the third exemplary embodiment, recovery of the symmetric key is achieved by constructing a third-degree polynomial (i.e., curve) utilizing first, second, third and fourth shares (e.g., $(x_0,y_0)$, $(x_1,y_1)$, $(x_2,y_2)$, $(x_3, y_3)$); the y-intercept of the constructed third-degree polynomial being the symmetric key.

To consider an example in accordance with the third exemplary embodiment of the present invention, assume points $(x_0, y_0)=(17, 15)$, $(x_1, y_1)=(5, 10)$, $(x_2, y_2)=(12, 6)$ and $(x_3, y_3)=(3, 12)$ and p=23. The third-degree polynomial:

$$f(x)=a_3x^3+a_2x^2+a_1x+a_0 \pmod{23}$$

passing through $(x_0, y_0)$, $(x_1, y_1)$, $(x_2, y_2)$ and $(x_3, y_3)$ can be constructed by solving:

$$a_3*(17^3)+a_2*(17^2)+a_1*(17)+a_0=15 \pmod{23}$$

$$a_3*(12^3)+a_2*(12^2)+a_1*(12)+a_0=6 \pmod{23}$$

$$a_3*(5^3)+a_2*(5^2)+a_1*(5)+a_0=10 \pmod{23}$$

$$a_3*(3^3)+a_2*(3^2)+a_1*(3)+a_0=12 \pmod{23}$$

The solution $(a_3, a_2, a_1, a_0)=(18, 19, 0, 22)$ gives the polynomial:

$$f(x)=18x^3+19x^2+0x+22 \pmod{23}$$

The value of the secret S can be discovered by computing f(0):

$$S=f(0)=22 \pmod{23}$$

As shown in FIG. 5, the first, second, third and fourth shares may be expressed as points on a Euclidean plane. For demonstrative purposes the plot in FIG. 5 is obtained using real numbers, and not modular arithmetic.

Multiple shares as described above can also be used to build a convenient key management scheme for a conditional access system. Conditional access system operators often define three levels of keys: (1) individual, (2) group, and (3) regional. Subscribers of the conditional access system may be assigned one or more of these different authorization levels by storing different numbers of shares in their respective smart cards.

Consider a conditional access system in which a specified population of smart cards is used for controlling access to the system. Three different card types may be manufactured:
  (1) Level 1 Smart Card—all the smart cards in the broadcast 'region' are assigned one common share (i.e., a share common to all smart cards in the region);
  (2) Level 2 Smart Card—all the smart cards in a specified group are assigned an additional common share (i.e., another share common to all smart cards in the specified group); and
  (3) Level 3 Smart Card—each smart card is assigned a unique additional share.

The above-described smart cards may be used in conjunction with an 'activating' share to descramble certain programs. Since the Level 1 smart card includes only one share, while the Level 2 smart card includes 2 shares, and the Level 3 smart card includes 3 shares, each card will provide different sets of descrambling keys. Thus, all smart cards in the broadcast region (i.e., Level 1 smart cards) will have the ability to receive and descramble the general broadcast (e.g., basic television channels), but only Level 2 Smart Cards will have the ability to receive and descramble some additional programs (e.g., HBO, Showtime, etc.), and only Level 3 Smart Cards will have the ability to receive and descramble certain other additional programs (e.g., PPV movies, etc.). It will be noted that the shares which are placed in the Level 1–3 smart cards comprise 'propositioned' information which may be used in conjunction with an 'activating' share to compute a secret (e.g., the descrambling key).

Figure 6:
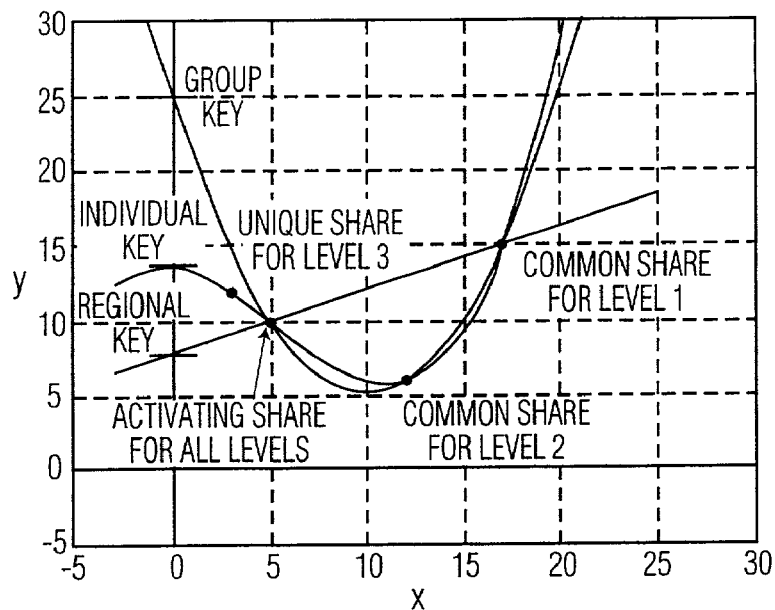
FIG. 6 is a graphical representation of the determination of a plurality of scrambling keys in accordance with a fourth exemplary embodiment of the present invention.
Figure 7:
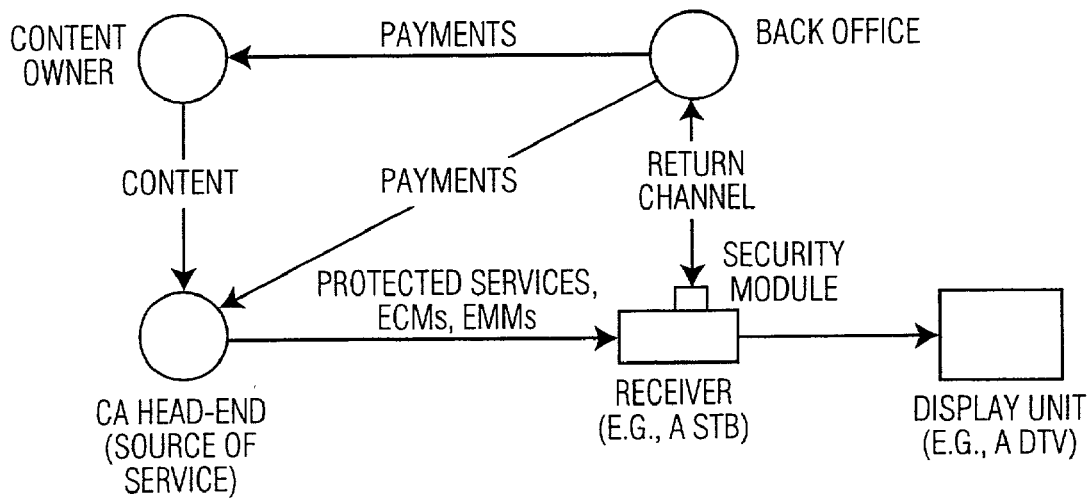
FIG. 7 is a block diagram showing a conventional conditional access system.
Figure 8:
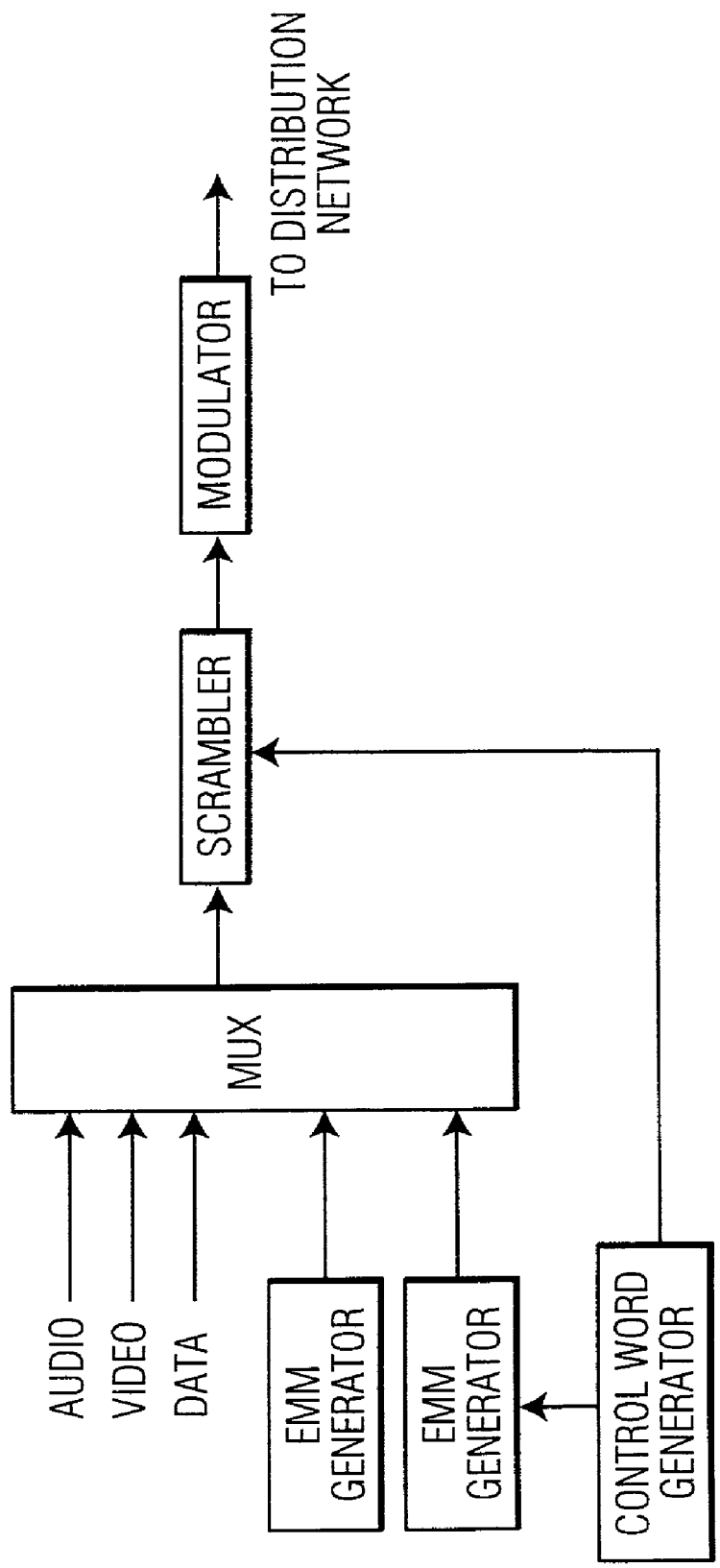
FIG. 8 is a block diagram showing a conventional transmitter side architecture for a conditional access system.
Figure 9:
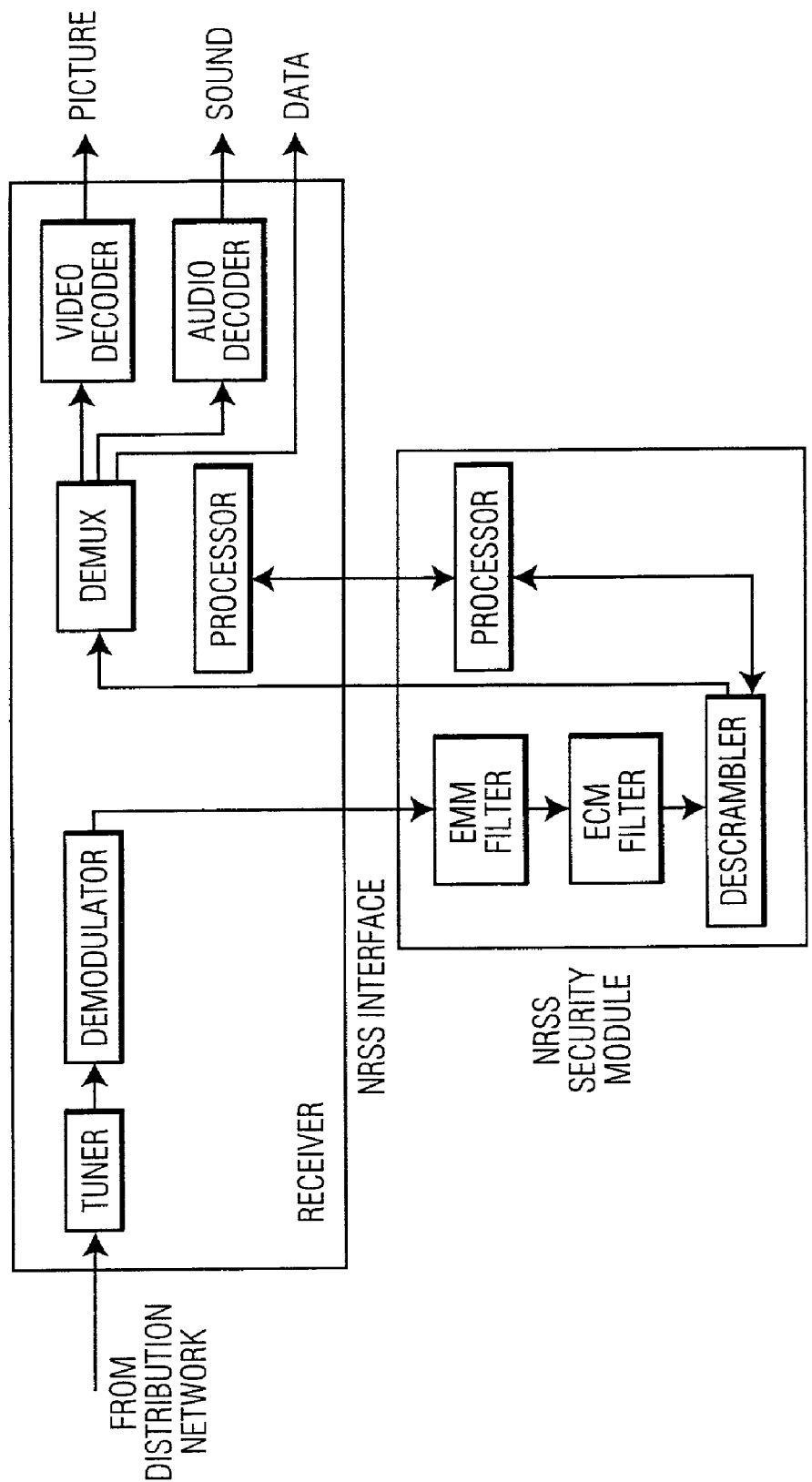
FIG. 9 is a block diagram showing a conventional receiver side architecture for a conditional access system.

FIG. 6 shows how the multiple share scheme would be constructed using the Euclidean plane. As will be understood, the three different authorization levels correspond to the three y-intercepts (i.e., "regional key", "group key", "individual key"). The first-degree polynomial (corresponding to the Level 1 or 'regional' authorization) comprises a line passing through an 'activating share' and a Level 1 common share. The second-degree polynomial (corresponding to the Level 2 or 'group' authorization) comprises a parabola passing through the 'activating' share, the Level 1 common share, and a Level 2 share. The third-degree polynomial (corresponding to the Level 3 or 'individual' authorization) comprises a curve passing through the 'activating share', the Level 1 common share, the Level 2 share, and a Level 3 share. In the above example, it will be noted that the 'activating' share is used to compute each of the different keys (i.e., individual, group and regional). It should be noted that for demonstrative purposes the plot in FIG. 6 is obtained using real numbers, and not modular arithmetic.

Using the above example, the table below describes the relationship between the shares and the different authorization levels:

| Point | First Degree Level 1 | Second Degree Level 2 | Third Degree Level 3 |
|---|---|---|---|
| Activating Share = (5, 10) | Yes | Yes | Yes |
| Level 1 common share = (17, 15) | Yes | Yes | Yes |
| Level 2 share = (12, 6) | | Yes | Yes |
| Level 3 share = (3, 12) | | | Yes |

Although the above-described method and apparatus have been described in the context of a conditional access system for delivering multimedia content, the principles of the present invention may also be applied to a method and apparatus for secure communications between a sender and receiver of information.

Some of the advantages of the above-described method and apparatus include:

(a) Reduction in computational requirements for the receiver in symmetric key recovery (i.e., for each key, only a simple operation is performed). This is in contrast to RSA decryption which involves modular exponentiation.

(b) Security is 'perfect.' In other words, given the activating share, all values of the secret remain equally probable. For higher degree polynomials, the task of determining the secret given the activating share becomes even more difficult.

(c) For a given set of 'prepositioned' information shared between a sender and receiver, different symmetric keys can be easily derived and frequently used (i.e., by changing the 'activating' share).

(d) Different authorization levels can be defined by assigning different shares to the respective receivers.

(e) Security does not rely on unproven mathematical assumptions (i.e., the security of RSA is based on the difficulty of the integer factorization problem).

The above-described scheme effectively combines the advantages of symmetric and public key systems. The 'prepositioned' information can be considered to be the private key of the receiver. The symmetric key to be constructed is determined by the public information sent as part of the ECM. As the descrambling keys are not generated at the source of the broadcast, no additional cipher is needed to protect them in distribution.

The effectiveness of the above-described schemes can be increased in various ways including:

(1) Defining the scrambling key as a function of the shared secret: In general, the key can be generated by evaluating a predefined function at the value of the secret. For example, if the shared secret (e.g., Y-intercept of the function f(x)) were the real number 7, the key might be defined as the square root of 7. In this way, even if one were to discover the secret, one does not necessarily have the ability to perform descrambling. Alternatively, any other definition can be used once the coefficients of the polynomial are obtained. For practical purposes, the function may need to have an entropy preserving property (i.e, entropy (secret) =entropy [f(secret)].

(2) Making the degree of the polynomial function (and thus the number of shares needed to discover the secret) a time-dependent secret system parameter: e.g., the degree of the polynomial f(x) defining the secret would change from day-to-day, hour-to-hour, etc. Cryptanalysis would become a more demanding task for adversaries because they would have to first determine the degree of the polynomial.

(3) Masking the activating share before transmission: The activating share transmitted with the scrambled content can then be unmasked by the receiver in a predefined process. An example of masking would be using a hash value of the activating share for content scrambling, but transmitting the activating share instead. Then, the receiver would perform hashing to determine the actual value.

(4) Adding redundant activating shares: Additional activating shares transmitted with the actual activating share are filtered out by the receiver in a predefined process.

Any combination of the above-referenced improvements will serve to hide the real value of the activating share in transmission, and introduces an additional level of security for the content.

Although the invention has been described in terms of a secret sharing scheme which may use first, second and third degree polynomial equations in forming a secret, it will be understood by those skilled in the art that any degree polynomial equation (e.g., fourth degree, fifth degree, etc.) may be used. In fact, higher degree polynomial functions will be preferred in that they provide additional security over lower order polynomial functions due to the increased number of shares which must be estimated. Furthermore, although the above description focuses on a system with a single smart card (e.g., smart card 42), it will be understood by those skilled in the art that multiple smart cards may be used, each smart card having one or more share values stored therein.

What is claimed is:

1. A method for managing access to a signal, said method comprising:
   receiving, in a smart card, data representative of a first share being transmitted with the signal;
   constructing a symmetric scrambling key using said first share and at least two additional shares, said at least two additional shares being stored in said smart card, said first and at least two additional shares constituting a subset of a total number of shares, and representing a threshold number of shares necessary to generate said symmetric scrambling key; and
   descrambling the signal using said constructed scrambling key to provide a descrambled signal.

2. The method of claim 1 wherein said first, second and third shares are points on a Euclidean plane.

3. The method of claim 1, wherein said first share and said at least two additional shares are points on at least a second degree polynomial function.

4. The method of claim 1, wherein the at least two additional shares comprise at least three additional shares, such that said first share and said at least three additional shares are points on at least a third degree polynomial function.

5. The method of claim 1, wherein the scrambling key comprises a secret value computed from the first and the at least two additional shares.

6. The method of claim 1, wherein the scrambling key comprises a function of a secret value computed from the first and the at least two additional shares.

7. The method of claim 1, wherein the first share and the at least two additional shares comprise points on a polynomial function.

8. The method of claim 7, wherein the degree of the polynomial function is altered periodically.

9. The method of claim 1, comprising the further step of: masking the first share before receiving the first share in the smart card.

10. The method of claim 9, comprising the further step of: computing the first share from the masked version of the first share.

11. The method of claim 1, comprising the further step of: transmitting a first share and at least one redundant share.

12. The method of claim 11, comprising the further step of: filtering out said at least one redundant share after receiving said first share in said smart card.

13. A method for managing access to a signal representative of an event of a service provider, said method comprising:
receiving said signal in a smart card, said signal being scrambled using a symmetric scrambling key;
receiving with said received signal, in said smart card, data representative of a first share;
constructing said scrambling key using said first share and second and third shares, said second and third shares being stored in said smart card, said first, second and third shares constituting a subset of a total number of shares, and representing a threshold number of shares necessary to generate said symmetric scrambling key; and
descrambling said signal using said constructed scrambling key to provide a descrambled signal, wherein the step of constructing said scrambling key comprises calculating the Y-intercept of the curve formed on said Euclidean plane by said first, second and third shares.

14. The method of claim 13 wherein said first, second and third shares are points on a Euclidean plane.

15. The method of claim 13 wherein said smart card has a card body having a plurality of terminal pins arranged on a surface of said card body in accordance with one of ISO 7816 and PCMCIA card standards.

16. A system for managing access between a service provider and a device having a smart card coupled thereto, said device performing the steps of:
receiving a signal in the smart card, said signal being scrambled using a symmetric scrambling key;
receiving with said received signal, in said smart card, data representative of a first share;
constructing said scrambling key using said first share and second and third shares, said second and third shares being stored in said smart card, said first, second and third shares constituting a subset of a total number of shares, and representing a threshold number of shares necessary to generate said symmetric scrambling key; and
descrambling said signal using said constructed scrambling key to provide a descrambled signal, wherein the step of constructing said scrambling key comprises calculating the Y-intercept of the curve formed on said Euclidean plane by said first, second and third shares.

17. A conditional access system comprising:
at least one program service provider; and,
a digital device including at least one smart card for receiving from the at least one program service provider a scrambled signal and a first share transmitted with the scrambled signal;
wherein said at least one smart card includes second and third shares stored therein for descrambling the scrambled signal, said second and third shares being used in conjunction with said first share to descramble said scrambled signal, said first, second and third shares constituting a subset of a total number of shares, and representing a threshold number of shares necessary to descramble said scrambled signal.

18. A method for operating a conditional access system comprising the steps of:
transmitting a scrambled signal and a first share with the scrambled signal from a service provider to a digital device;
receiving in the digital device said scrambled signal and said first share;
constructing a scrambling key using said first share and at least two additional shares, said at least two additional shares being stored in a smart card of the digital device, said first and at least two additional shares constituting a subset of a total number of shares, and representing a threshold number of shares necessary to construct said scrambling key; and
descrambling the signal using said constructed scrambling key to provide a descrambled signal.

19. A conditional access system comprising:
a transmitter; and,
a receiver including at least one smart card for receiving from the transmitter a scrambled signal and a first share transmitted with the scrambled signal, wherein said at least one smart card includes second and third shares stored therein for descrambling the scrambled signal, said second and third shares being used in conjunction with said first share to descramble said scrambled signal, said first, second and third constituting a subset of a total number of shares, and representing a threshold number of shares necessary to descramble said scrambled signal.

* * * * *